(12) United States Patent
Williger et al.

(10) Patent No.: US 10,824,968 B2
(45) Date of Patent: Nov. 3, 2020

(54) TRANSFORMATION OF LOGICAL DATA OBJECT INSTANCES AND UPDATES TO SAME BETWEEN HIERARCHICAL NODE SCHEMAS

(71) Applicant: SAP SE, Walldorf (DE)

(72) Inventors: Mathias Williger, Leimen (DE); Min-Ho Hong, Walldorf (DE); Lars Vogelgesang-Moll, Heidelberg (DE)

(73) Assignee: SAP SE, Walldorf (DE)

( * ) Notice: Subject to any disclaimer, the term of this patent is extended or adjusted under 35 U.S.C. 154(b) by 925 days.

(21) Appl. No.: 15/442,355

(22) Filed: Feb. 24, 2017

(65) Prior Publication Data

US 2018/0247235 A1 Aug. 30, 2018

(51) Int. Cl.
*G06Q 10/06* (2012.01)
*G06F 16/2453* (2019.01)
*G06F 16/21* (2019.01)

(52) U.S. Cl.
CPC ....... *G06Q 10/0631* (2013.01); *G06F 16/213* (2019.01); *G06F 16/24534* (2019.01)

(58) Field of Classification Search
CPC ............ G06F 16/24534; G06F 16/212; G06F 16/211; G06F 16/213; G06F 16/214; G06F 16/282; G06F 16/2343; G06F 16/2365; G06F 16/289; G06F 16/28; G06Q 10/0631
See application file for complete search history.

(56) References Cited

U.S. PATENT DOCUMENTS

| | | | |
|---|---|---|---|
| 2005/0071359 A1* | 3/2005 | Elandassery | G06F 16/213 |
| 2010/0070535 A1* | 3/2010 | Irun-Briz | G06F 16/213 707/802 |
| 2011/0307501 A1* | 12/2011 | Terwilliger | G06F 16/213 707/756 |
| 2013/0085991 A1* | 4/2013 | Welden | G06F 16/213 707/634 |
| 2013/0262522 A1* | 10/2013 | van Rotterdam | G06F 17/30961 707/802 |

(Continued)

OTHER PUBLICATIONS

Tokuda, Lance, and Don Batory. "Evolving object-oriented designs with refactorings." Automated Software Engineering 8, No. 1 (2001): 89-120. (Year: 2001).*

(Continued)

*Primary Examiner* — Jesse P Frumkin
(74) *Attorney, Agent, or Firm* — Klarquist Sparkman, LLP

(57) ABSTRACT

Update elements allow logical data object instances, and change requests therefor, to be converted from a first schema to a second schema. For logical data object instances, a transformation function can add nodes to, or remove nodes from a hierarchy of the first schema, or rearrange them. Use of the transformation function can allow second schemas to be defined that change a node hierarchy, yet can be used with existing logical data object instances in the first schema. Changes to logical data object instances can be converted using a mapping or a transformation function, such as a transformation function useable to convert logical data object instances between the first and second schemas. The migration of change requests to the second schema can allow logical data object instances having previously scheduled change requests to be updated from the first schema to the second schema prior to execution of the change request.

20 Claims, 13 Drawing Sheets

(56) References Cited

U.S. PATENT DOCUMENTS

| | | | |
|---|---|---|---|
| 2014/0143284 A1* | 5/2014 | McCaffrey | G06F 16/213 707/803 |
| 2015/0120353 A1 | 4/2015 | Williger et al. | |
| 2016/0283526 A1* | 9/2016 | Shmueli | G06F 16/213 |
| 2018/0089250 A1* | 3/2018 | Collins | G06F 16/282 |
| 2018/0096043 A1* | 4/2018 | Ledbetter | G06F 16/213 |
| 2019/0129890 A1* | 5/2019 | Zhuang | G06F 16/254 |

OTHER PUBLICATIONS

Pereira, Rui Humberto. "Transactions and schema evolution in a persistent object-oriented programming system." (2015). (Year: 2015).*

"Action," retrieved from https://help.sap.com/saphelp_nw75/helpdata/en/23/04dc37a013400b94a377cd057d7f13/content.htm, on or before Feb. 23, 2017, 3 pages.

"Business Object Modeling," retrieved from http://help-legacy.sap.com/saphelp_studio_1308/KTP/Products/bf889ebdf45d4dd19d4a0e0bd39a07fb/BOModelingGuideline/ESS_CON_BO_Modeling_Introduction.html, on or before Feb. 23, 2017, 9 pages.

"Data Transfer Process," retrieved from https://help.sap.com/saphelp_nw70/helpdata/en/42/f98e07cc483255e10000000a1553f7/content.htm, on or before Feb. 23, 2017, 3 pages.

"Configuration of the Transfer Process," retrieved from https://help.sap.com/saphelp_dimp50/helpdata/en/6e/37e340f6bd3d43e10000000a155106/content.htm, on or before Feb. 23, 2017, 5 pages.

Hiremath, Vishal, "Insurance Policy Management with SAP," retrieved from http://www.serole.com/blog/insurance-policy-management-sap/, on or before Feb. 23, 2017, 3 pages.

Wood, James, "Navigating the BOPF: Part 2—Business Object Overview," retrieved from https://blogs.sap.com/2013/01/04/navigating-the-bopf-part-2-business-object-overview/, on or before Feb. 23, 2017, 17 pages.

"Replacement Business, Sales Product Change/Product Change," retrieved from http://help-legacy.sap.com/saphelp_pm50/helpdata/en/48/3eefb2252f72d0e10000000a42189c/content.htm, on or before Feb. 23, 2017, 2 pages.

Govil, Saumya, "SAP Business Object Types," retrieved from https://wiki.scn.sap.com/wiki/display/BOBJ/SAP+Business+Object+Types, on or before Feb. 23, 2017, 5 pages.

"SAP Business Objects," retrieved from https://help.sap.com/saphelp_nw70/helpdata/en/7e/5e11a84a1611d1894c0000e829fbbd/content.htm, on or before Feb. 23, 2017, 4 pages.

"Time Model Function," retrieved from http://help-legacy.sap.com/saphelp_pm50/helpdata/en/48/455e2f50903912e10000000a42189b/content.htm, on or before Feb. 23, 2017, 4 pages.

"Validation," retrieved from https://help.sap.com/saphelp_scm700_ehp03/helpdata/en/5b/4ccc53ea4a214be10000000a174cb4/frameset.htm, on or before Feb. 23, 2017, 1 page.

\* cited by examiner

TRANSFORMATION OF LOGICAL DATA OBJECT INSTANCES AND UPDATES TO SAME BETWEEN HIERARCHICAL NODE SCHEMAS

BACKGROUND

Businesses maintain an ever-increasing amount of data in databases and enterprise resource management systems. The data is often organized in a complex manner that can relate to its use. For instance, data for a particular activity or purpose may be structured as a hierarchy of nodes, where each node can include one or more data fields, one or more operations that can be carried out on the data fields, and information specifying related nodes, or even other nodal hierarchies. These types of data structures can be referred to as logical data objects.

The circumstances regarding these types of data collections can change over time. For instance, legal requirements may require a restructuring of elements (e.g., nodes or components thereof) of a logical data object, including alterations in the node hierarchy and the content of nodes. Similarly, changes in business operations may require a change in the logical data objects used in such operations.

In some cases, it can be desirable to convert logical data object instances from an older format to an updated format. However, typically, databases and ERP systems provide only limited ability to migrate logical data object instances to a new structure or schema. For example, it may be possible to add data fields to, or remove data fields from an existing logical data object schema to provide a new logical data object schema. More complex changes are typically not supported.

If legacy instances of a logical data object are needed, the inability to transfer their data to a logical data object instance with a schema having more complex changes, such as structure changes in a node hierarchy, can drastically limit the flexibility in creating new logical data object schemas, and in turn the operation of a business. In addition, problems can arise if change requests or updates to logical data objects exist, but are scheduled to be applied at a future date, such as after logical data object instances in the old schema have been migrated to a new schema. That is, when the change request is triggered to be applied, the change request may be specified in the old schema, and thus may not be applicable to the updated schema. Similarly, in some cases, it can be desirable to backdate changes to a logical data object instance. If the logical data object instance has been migrated to a new schema, applying the backdated update may not produce the same results as if the backdated update were applied to the logical data object instance in the legacy schema. Accordingly, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as one or more computer-readable media comprising computer-executable instructions that, when executed, cause a computing system to perform processing to convert a logical data object instance from a first schema to a second schema. The processing comprises receiving a request to instantiate a plurality of instances of a logical data object. Each of the plurality of logical data object instances are associated with a first schema, the first schema comprising a plurality of nodes arranged in a first hierarchical structure.

For each of multiple modes of the plurality of nodes for each of the plurality of logical data object instances, data fields are populated with data from one or more data tables. For each of multiple nodes of the plurality of nodes for each of the plurality of logical data object instances, one or more validation checks are applied to the populated data fields to provide validated data. A transformation function is applied to each valid logical data object instance. The transformation function converts the first schema to a second schema, the second schema having a second hierarchical node structure. The second hierarchical node structure is different than the first hierarchical node structure.

An embodiment can be implemented as a system comprising memory; one or more hardware processors coupled to the memory; and one or more computer-readable media storing instructions that, when loaded into the memory, cause the one or more hardware processors to perform operations for converting a change request for a logical data object instance from a first schema to a second schema. The operations include receiving a change request for a logical data object instance. The change request is specified in a first schema and has an effective date. An update element is applied to the change request to convert the change request from the first schema to a second schema, providing a modified change request. The modified change request is stored. It is determined that the effective date has been reached, and the modified change request is applied to a logical data object instance specified by the modified change request. The logical data object instance is defined according to the second schema.

An embodiment can be implemented as a method carried out at least in part by a computing system. The method comprises receiving a plurality of logical data object instances defined in a first schema, the first schema specifying a first node hierarchy. A second schema is received, specifying a second node hierarchy. Compared with the first schema, the second node hierarchy includes one or more of an added node, a deleted node, and a rearranged node. A transformation function is received for converting logical data object instances from the first schema to the second schema. The transformation function is applied to each of the plurality of logical data object instances to provide modified logical data object instances in the second schema. The applying comprises, compared with a logical data object instance in the first schema, one or more of adding a node, deleting a node, and rearranging a node.

The various innovations can be used in combination or separately. As described herein, a variety of other features and advantages can be incorporated into the technologies as desired. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Example 1—Example Overview

Figure 1:
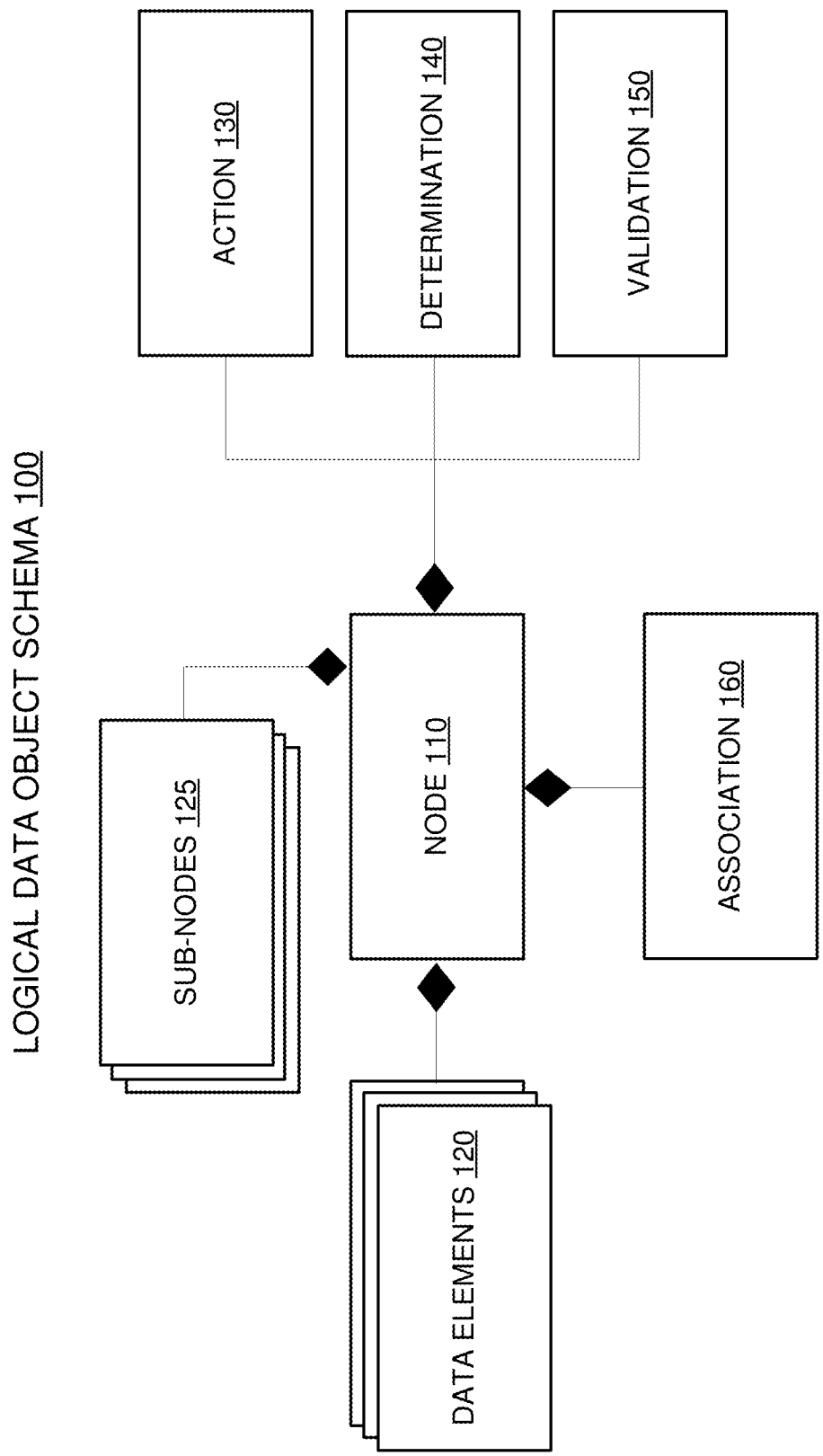
FIG. 1 is a block diagram depicting a schema for a logical data object.

Businesses maintain an ever-increasing amount of data in databases and enterprise resource management systems. The data is often organized in a complex manner that can relate to its use. For instance, data for a particular activity or purpose may be structured as a hierarchy of nodes, where each node can include one or more data fields, one or more operations that can be carried out on the data fields, and information specifying related nodes, or even other nodal hierarchies. These types of data structures can be referred to as logical data objects.

The circumstances regarding these types of data collections can change over time. For instance, legal requirements may require a restructuring of elements (e.g., nodes or components thereof) of a logical data object, including alterations in the node hierarchy and the content of nodes. Similarly, changes in business operations may require a change in the logical data objects used in such operations.

In some cases, it can be desirable to convert logical data object instances from an older format to an updated format. However, typically, databases and ERP systems provide only limited ability to migrate logical data object instances to a new structure or schema. For example, it may be possible to add data fields to, or remove data fields from an existing logical data object schema to provide a new logical data object schema. More complex changes are typically not supported.

If legacy instances of a logical data object are needed, the inability to transfer their data to a logical data object instance with a schema having more complex changes, such as structure changes in a node hierarchy, can drastically limit the flexibility in creating new logical data object schemas, and in turn the operation of a business. In addition, problems can arise if change requests or updates to logical data objects exist, but are scheduled to be applied at a future date, such as after logical data object instances in the old schema have been migrated to a new schema. That is, when the change request is triggered to be applied, the change request may be specified in the old schema, and thus may not be applicable to the updated schema. Similarly, in some cases, it can be desirable to backdate changes to a logical data object instance. If the logical data object instance has been migrated to a new schema, applying the backdated update may not produce the same results as if the backdated update were applied to the logical data object instance in the legacy schema. Accordingly, there remains room for improvement.

The present disclosure provides innovations in migrating logical data object instances from a legacy schema to a new schema, where the new schema can have more significant changes than the addition or removal of fields from a common node hierarchy. For instance, the new schema can have more or fewer nodes than the legacy schema, and nodes may be arranged differently in the hierarchy. A transformation function can be defined that transforms logical data object instances between schemas having different node structures.

In some cases, the transformation function can be applied on an ad hoc basis, such as when an individual logical data object instance is to be migrated to a new schema. For instance, an application can call methods of an API to obtain information from the logical data object instance and transfer the data to a logical data object instance in the new schema. In other cases, the transformation function can be applied to each legacy logical data object instance in a batch of instances. The batch transformation may be part of migrating all active logical data object instances to a new schema.

The ability to transform logical data object instances from a legacy schema to an updated schema having a different node structure can provide a number of advantages. It can allow businesses to make more radical changes to their operations, as those changes can be propagated to the associated data and data structures. However, changing the logical data object schema can also improve the performance of computing systems that store and manipulate logical data object instances. That is, a reorganization of a node hierarchy, including potentially adding or removing nodes, can reduce the amount of memory or secondary storage space needed to hold the logical data object instances. Reorganization of a node hierarchy can also speed operations, such as queries or calculations involving the logical data object instances, and reduce processor use.

Transforming logical data object instances between two schemas during a batch process can provide additional advantages. One advantage is the potential for improved error handling. As part of a migration process, changes to logical data object instances may be made. If one change fails, other changes may need to be reversed in order to correct an error. If the changes are made outside of an internal migration process, even if part of a batch process (e.g., using an API to obtain data and store the data in instance of a new logical data object schema) the changes may simply fail, and an error message generated. Even if the error is identified during the process, it may be difficult, or time and resource consuming, to undo the changes and either revert to the legacy version of the logical data object instance or correct the error and attempt to reapply the changes. After the solution to the error is identified, the logical data object instance may have to be reloaded and appropriately modified so that the changes can be applied. Reloading a logical data object instance can be an expensive operation, in terms of processor use and input/output time, as instantiating a logical data object instance can involve multiple database fields, data integrity checks, and calculations. Even if no errors are encountered, the cost of loading a logical data object instance outside of an internal migration process can be expensive, for the reasons set forth above.

As part of an internal migration process, both versions (in the legacy and updated schemas) of a logical data object instance may be available (e.g., in-memory). Having both versions of the instance available can be beneficial, such as for undoing changes if an error is encountered. During an internal migration procedure, various calculations and data transformations may be made before a new schema is applied to a logical data object instance. Even if logical data object instances can be accessed and modified using an API, it may not be simple, or even possible, to apply ad hoc calculations or transformations to data in instances of the old schema and transfer the results to instances of the new schema. Thus, carrying out an internal migration process can reduce time and resource use in migrating logical data object instances between schemas, as well as providing improved error handling.

The disclosed innovations also provide for improved handling of scheduled change request, or updates, to logical data object instances. As described above, in some cases, it may be known that changes to a logical data object instance are desired, but for analog-world or other reasons it may be desired for the change requests or updates to not be made immediately, but at a future date. These pending changes may have been defined with respect to a legacy schema, and may not be suitable for use with the updated schema. Prior systems may not have provided support for modifying prospective change requests or updates, and so logical data object instances having such pending change requests may simply have been marked as unsuitable for migration. While the logical data object instances could be transitioned after the changes were made, that can necessitate additional migration processes, which could consume more resources and be more complex to schedule.

The innovations of the present disclosure allow one or more update elements, such as mappings or transformation functions, to modify the change request so that it is applicable to the updated schema. In some cases, the changes to the scheduled change requests can be made as part of a migration process where the logical data object instance is transferred from the legacy schema to the new schema. The modified change requests can be stored and then applied at their scheduled time. This can be advantageous because, in at least some aspects, the same update element can be used to migrate the logical data object instance and its update to the new schema, which can reduce memory and processor use. In other cases, the update element can be applied to the update when the scheduled update time is reached.

The disclosed innovations also allow backdated changes to be applied to a logical data object instance, using the logical data object instance in the legacy schema. For example, the schema changes may be such that applying the change request to the logical data object instance in the new schema produces a different result than applying the change to the logical data object instance in the old schema (including, in some cases, because data fields, values thereof, or calculations, are different between the two schemas). Using an update element, such as an inverse of the update element used to convert the old schema to the new schema, both the backdated change request and the logical data object instance in the new schema can be converted into the old schema. Or the backdated change can be specified in the old schema, and the logical data object instance transformed to the old schema. After the change request in the old schema is applied to the logical data object instance in the old schema, the updated logical data object instance can be transformed again into the new schema using the update element. Thus, disclosed innovations can provide the ability to make backdated changes, and improved data accuracy for backdated changes.

Example 2—Logical Data Object Schema

In any of the examples described herein, a logical data object can contain a definition of a hierarchical data structure and definitions of one or more operations that can be performed using portions of the hierarchical data structure. In some cases, a logical data object may be referred to as a "business object" and can take any number of forms including business intelligence or performance management components such as those implemented in software technologies of SAP BusinessObjects, ORACLE Hyperion, IBM Cognos, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations.

FIG. 1 is a diagram of an example logical data object schema 100. A node 110 can contain one or more data elements 120. A data element 120 can contain an identifier, such as a name, and an associated value. The identifier can, for example, be associated with a field of a particular database table. In at least some embodiments, the data element 120 can be associated with a data type that restricts and/or validates the type of data that can be stored as a value of the data element 120.

The node 110 can contain one or more child nodes 125 (also referred to as sub-nodes), which can themselves contain additional data elements 120 (and other node components, including sub-nodes 125). Combinations of sub-nodes 110 can be used to define a hierarchical data structure of multiple nodes 110. In at least some embodiments, the hierarchical data structure can contain a root node that does not have a parent-node and can be used as an entry point for traversing the hierarchical data structure.

Each node 110 in the logical data object can be associated with one or more actions 130. An action 130 can comprise a definition for a logical operation that can be performed using the node 110 with which it is associated. The action 130 can contain an identifier that can be used to invoke the action's logical operation. Each node 110 in the logical data object can be associated with one or more determinations 140. A determination 140 can contain a definition for a logical operation that can be automatically executed when a trigger condition is fulfilled. Example trigger conditions can include a modification of the associated node 110, a modification of the data element 120 of the associated node, the creation of a data element 120 of the associated node, etc. A logical operation defined by an action 130, or a determination 140, can comprise instructions to create, update, read, and/or delete one or more data elements 120 and/or one or more sub-nodes 125. Actions 130 or determinations 140 can be set to trigger, in some cases, upon the occurrence of a particular date (e.g., a particular date or a particular time on a particular date).

Each node 110 in the logical data object schema 100 can be associated with one or more validations 150. A validation 150 can contain a definition of one or more data integrity rules and/or checks. The one or more data integrity rules and/or checks can be performed when the associated node 110, and/or one or more data elements 120 of the associated node, are created, modified, and/or deleted. Any such operation that does not satisfy the one or more data integrity rules and/or checks can be rejected.

Each node 110 in the logical data object schema 100 can be associated with one or more nodes from one or more other logical data objects (having the same schema or a different schema) by one or more associations 160. An association 160 can contain an identifier for a node in another logical data object that is associated with the node 110. Associations 160 can be used to define relationships among nodes in various logical data objects. The association 160, in at least some embodiments, contains an association type indicator that identifies a type of association between the node 110 and the node in the other logical data object.

Although the action 130 as defined and associated with the node 110, when the action 130 is invoked, it targets an identified instance of the node 110 with which it is associated. Similarly, a determination 140 and/or validation 150 can be defined and associated with a node 110, but can target an instance of the associated node 110 when it/they is/are invoked. Multiple instances of a given logical data object can be created and accessed independently of one another.

Although the instances of the logical data object share a common schema 100, the data values stored in their respective node instances and data element instances can differ, as can the logical data object instances that are associated by the associations 160. Additionally or alternatively, an instance of an association 160 can identify a particular instance of an associated node in another logical data object instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects including create, update, delete, read, and query operations. If the requested operation is a read operation, the data payload may contain a unique identifier associated with a logical data object instance to be retrieved. Processing a read operation request can comprise searching for an instance of the logical data object that is associated with the provided unique identifier in a data store, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided data values.

Example 3—Example Node Hierarchical Structures and Transformation Therebetween

Figure 2:
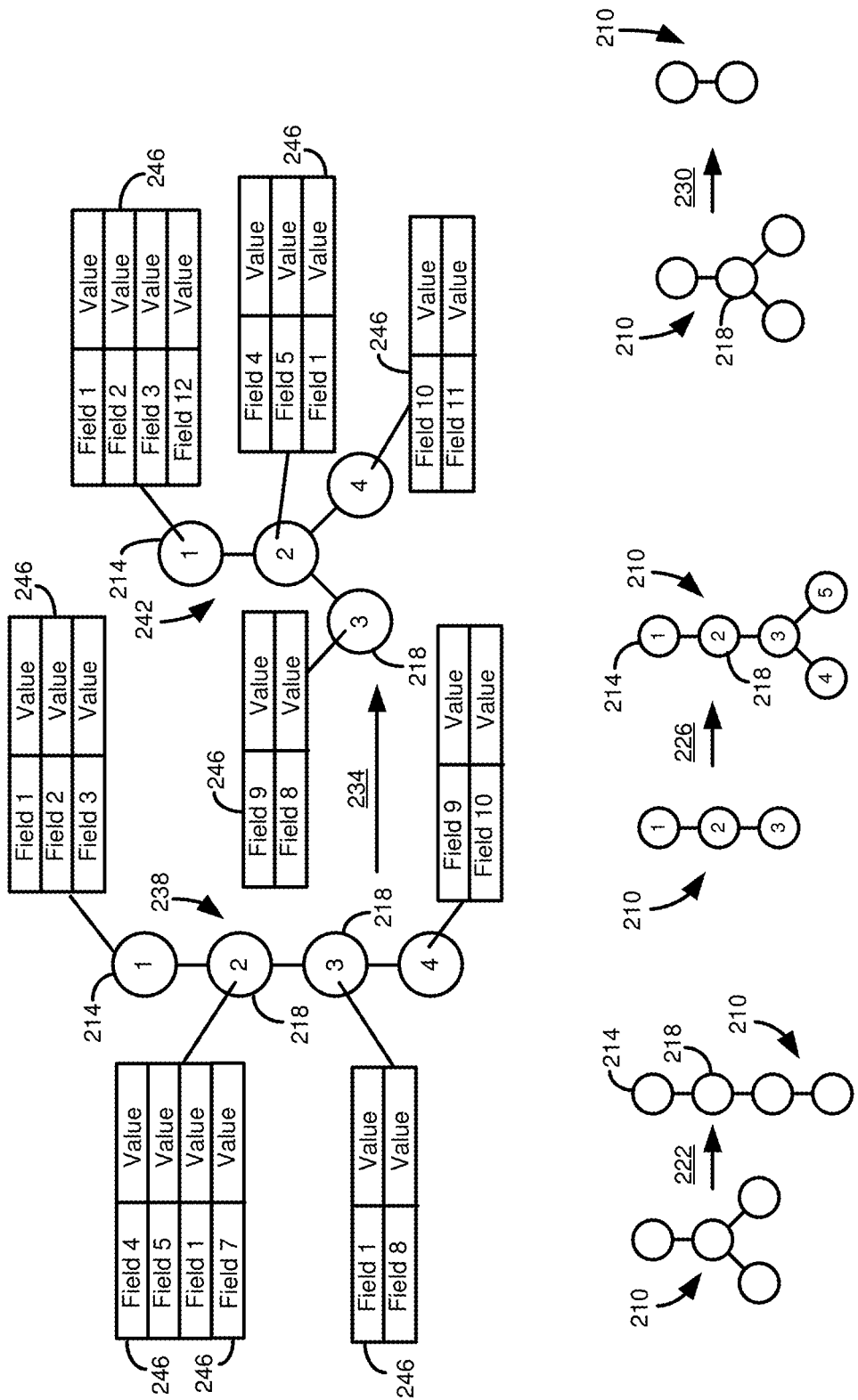
FIG. 2 is a schematic diagram illustrating hierarchical node structures of logical data object schemas and transformations between different hierarchies.

FIG. 2 illustrates the hierarchical node structures of a plurality of logical data objects 210, each having a schema. Each of the logical data objects 210 includes a root node 214 and one or more sub-nodes 218. The sub-nodes 218 are hierarchically arranged, with the sub-nodes being child nodes of the root node 214 or another sub-node.

A given logical data object 210 can be hierarchically transformed in a number of ways. As shown in transformation 222, the two logical data objects 210 have the same number of nodes, but one has a linear structure and the other is branched. In transformation 226, two nodes are added to the hierarchy of a logical data object, while in transformation 230 two nodes are removed from a logical data object. Although transformations 222, 226, 230 are provided for illustrative purposes, it should be appreciated that a logical data object 210 can have a larger number of nodes, and a more complex hierarchical structure than shown in FIG. 2. In addition, nodes can be both added and removed from a hierarchy, and nodes in a hierarchy can be rearranged along with other nodes being added and/or removed.

Transformation 234 illustrates portions of a schema for a logical data object 238 and its transformed logical data object 242. In particular, data fields 246 of the schemas are shown. Along with having one or more nodes added, removed, or repositioned, other schema elements, such as the data fields 246 (e.g. elements 120) can differ between two node schemas for a logical data object 210. Although data fields 246 are shown for purposes of illustration, it should be appreciated that one or more of actions 130, determinations 140, validations 150, and associations 160 can also differ between two schemas for a logical data object, in place of, or in addition to, the data fields 246.

With continued reference to transformation 234, the schema for logical data object 242 includes a data field 246, field 12, that has been added to the root node 214. Field 12 is not present in the schema for the logical data object 238. Similarly, the schema for logical data object 238 includes a sub-node 218, node 2, that has a data field 246, field 7, that has been entirely removed from the schema for the logical data object 242. Thus, although the root nodes 214 and sub-node 2 of the schemas for the logical data objects 238, 242 are in the same position in the hierarchy, and have generally similar content, and in at least some cases can have a common identifier, the content or elements of the nodes can differ between the schemas for the logical data objects 238, 242.

For nodes 214, 218 that have changed data fields 246 (or other components) between the schemas for the logical data objects 238, 242, the schemas can be related by mapping changes to the schema for the original logical data object 238 to the schema for the transformed logical data object 242. For instance, a mapping may provide a rule stating "add field 12 to node 1" or "remove field 7 from node 2."

While mapping may be sufficient to accomplish minor changes between logical data object schemas, they may not be sufficient to accomplish more significant changes between logical data object schemas, including changes that involve the structure of the node hierarchy, such as adding, removing, or repositioning one or more nodes. As explained in Example 2, a root node 214 can have multiple sub-nodes 218, and each sub-node can have one or more sub-nodes. When the identity of the root node 214 is changed, or its immediate child sub-nodes 218, or a sub-node is added, removed, or moved (collectively referred to as "modifications" providing a "modified node," where the modified node can be a node that has been removed from the hierarchy) within the hierarchy, the changes affect not just the modified node but nodes connected to the modified node. For example, referring the logical data object 238, data (or other components, such as validations or calculations) for node 2 can depend on the contents of node 3, which can in turn depend on the contents of node 4. In the schema for logical data object 242, node 4 is no longer directly connected to node 3, and so references in node 3 to data in node 4 may be undefined, and in turn references in node 2 to data in node 3 may be undefined, in turn affecting the values of the root node 214, node 1.

With reference to transformation 226, sub-nodes 4 and 5 were added to node 3. If a property that was formerly in node 3 was relocated into both sub-nodes 4 and 5, the change may not be one that can be accomplished using a simple mapping. Rather, more complex algorithms or functions may be needed to create and remove nodes (e.g., calling program methods or functions to create or remove a node), rather than just adding or removing fields to the same hierarchical arrangement of nodes. A function may be needed to be defined to segment the relocated property into separate components for nodes 4 and 5. Thus, maintaining the correct relationships of data elements between the node schemas may require more than both a simple mapping of fields or simply updating pointer references in a node to the new location of a new or relocated node. In addition, depending on the complexity of the changes to the schema, references in a node to elements of another node may distributed to multiple nodes in the new schema, which may not allow the hierarchy change to be made to the node by updating a single pointer to a related node.

In general, the types of changes that can be made between node schemas can include one or more of:
Adding fields (or other components) to a node without changing the node position;
Removing fields (or other components) from a node without changing the node position;
Adding one or more nodes (including a hierarchical arrangement of nodes);
Removing one or more nodes (including a hierarchical arrangement of nodes);
Relocating a node (which can include adding or removing fields or other node components);
Consolidating a property or component depending on multiple nodes to fewer nodes, including possibly removing one or more nodes; and
Distributing a property or component from one or more nodes to multiple or a larger number of nodes, including possibly adding one or more nodes.

As will be further described, changes between node schemas can be accomplished by one or more update elements, such as mappings, transformation functions, or combinations thereof. When transformation functions are used, a single transformation function can be defined to carry out the changes, or multiple transformation functions can be defined. For example, transformation functions can be carried out for discrete processes such as adding a node, removing a node, or relocating a node. In some cases, it can be beneficial to apply a mapping before applying one or more transformation functions to a schema. For example, the mapping can reduce the complexity of the transformation function needed for a schema change, or can allow more general transformation functions to be used (e.g., rather than creating specific transformation functions for specific schema changes, a mapping can be applied and then a general transformation function called with the appropriate arguments to accomplish a structural change).

Transformation functions can call additional functions related to logical data objects. For example, a logical data object can include methods (e.g., class methods, including methods assessable through an API), to create or define nodes, modify nodes, add or insert nodes, or remove or delete nodes.

Figure 3:
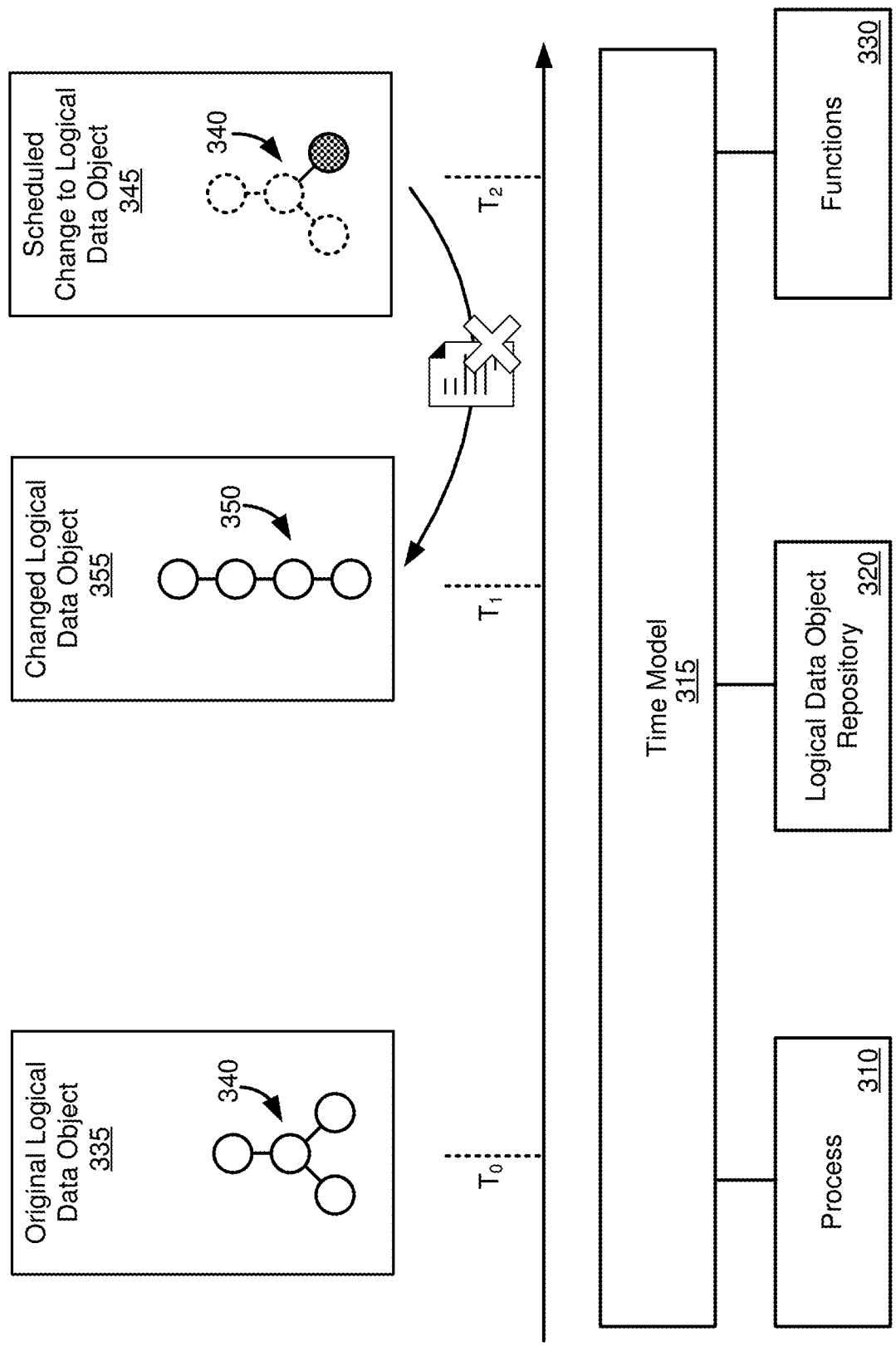
FIG. 3 is a diagram schematically depicting that scheduled updates may not be applied to logical data object instances in a schema having a changed node hierarchy.

Example 4—Change Requests that Cannot be Applied to Logical Data Object Instances Having Changed Schema FIG. 3 illustrates an example scenario where a scheduled update to a logical data object instance cannot be applied because of an intervening change to the structure of the logical data object instance. For example, it may be known that a value of a node of the logical data object instance should be changed, but the change should not be effective until a future date. Rather than manually waiting for the effective date to arrive, and manually making the change, it may be desirable to simply enter and schedule the change when the change request is received, hold the change request until the effective date, and then automatically apply the change request.

Such change requests are typically scheduled for logical data object instances having the same schema when the change is executed as when the change was scheduled. The changes can be entered and scheduled by a process 310 that uses logical data objects. The process 310 can register the change with a time model 315. The time model 315 can monitor scheduled changes and apply them when the triggering parameters have been met, such as an effective date being reached. When the triggering parameters have been met, the time model 315 can retrieve the logical data object instance from a logical data object repository 320 and apply the change.

In addition to scheduled changes to logical data object instances, the time model 315 can apply changes or updates to logical data objects that are part of the definition of a logical data object (e.g., specified as actions 130, determinations 140, or validations 150 of FIG. 1). For instance, a logical data object instance can include a calculation that should be run periodically, or a value that should be periodically updated. As part of the routine or scheduled ad-hoc updated, the time model 315 can access functions 330 that can define when changes should be triggered or calculations or processes that should be applied when a change is executed.

FIG. 3 illustrates an instance 335 of a logical data object defined according to a first schema 340 having a particular node hierarchy structure (e.g., a branched structure). At a time point $T_0$, a change request or update 345 is scheduled to be applied at a time point $T_2$. The change request 345 is specified according to the first schema 340 (e.g., a change to the shaded node). At a time point $T_1$, the schema for the logical data object instance 335 is changed from the first schema to a second schema 350 (e.g., having a linear structure), providing a modified logical data object instance 355. When the time model 315 determines that the update 345 should be executed at $T_2$, the update cannot be applied, because the change is to a node whose position in the hierarchy has been modified in the second schema 350. That is, the update 345 uses a references that is no longer valid in the second schema 350.

In the past, the typical solution to this issue was to not allow updates to the logical data object schema for logical data object instances having scheduled changes, or to only make schema modifications that would not create problems for the types of updates that might be scheduled. However, for the reasons described in Example 1, this solution can create other issues, such as the need to load or reload logical data object instances at another time (such as after a scheduled update is applied to the logical data object instance in the old schema). As will be described in Example 5, loading a logical data object instance can involve significant CPU resources and time, which can negatively affect the performance of a computer system.

Example 5—Example Loading of Logical Data Object Instances

Figure 4:
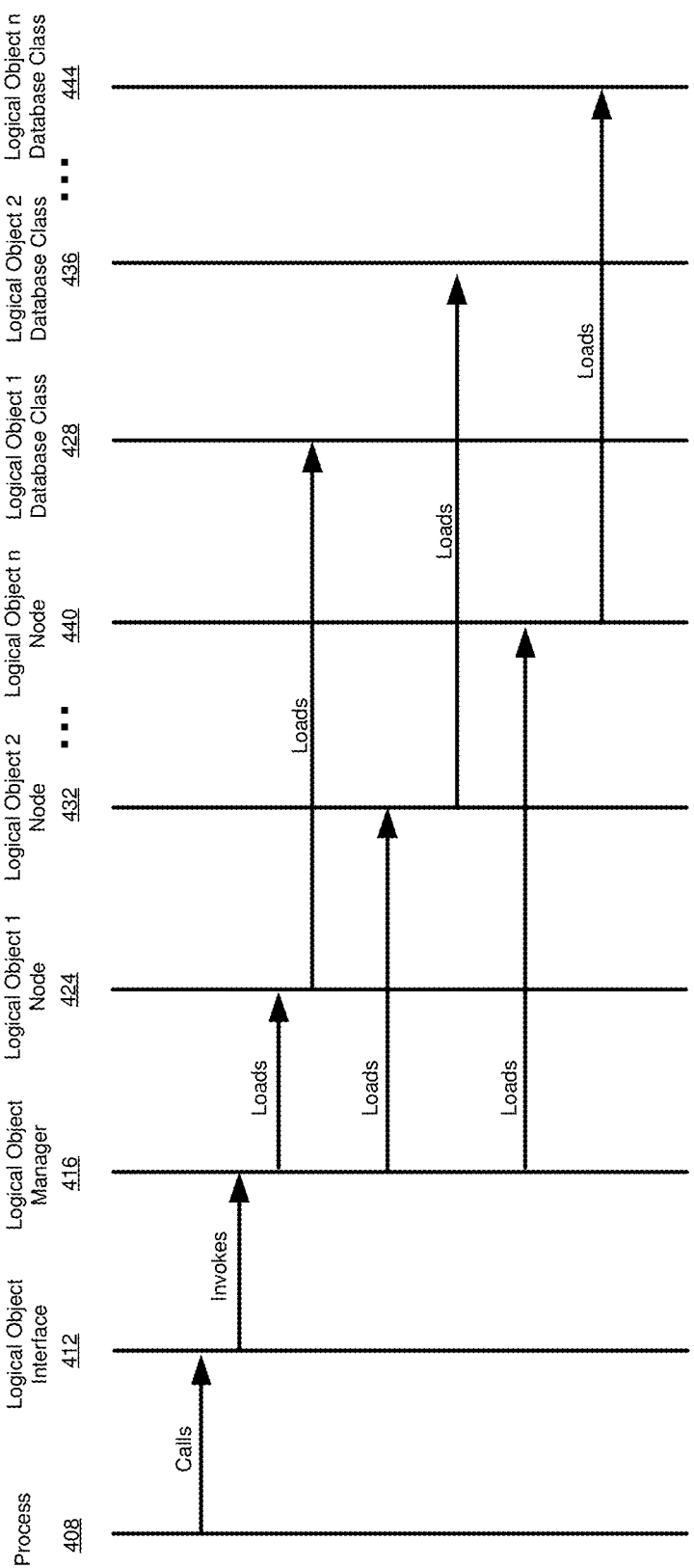
FIG. 4 is a diagram illustrating operations associated with loading logical data object instances.

FIG. 4 illustrates operations occurring at a process 408 that uses logical data object instances, a logical data object interface 412 that allows applications to manipulate (e.g., create, delete, read, and update) instances of logical data objects, and a logical data object manager 416 that carries out operations involving logical data object instances (e.g., implementing methods provided by the logical data object interface 412).

When logical data object instances are to be loaded, the process 408 can call a load process initiated by the logical data object manager 416 through the logical data object interface 412. As described in Example 2, and depicted in FIG. 1, a logical data object instance can include many different nodes. Each node can include one or more instances of one or more components (e.g., elements 120, such as data fields, actions 130, determinations 140, validations 150, or associations 160 of FIG. 1). Thus, loading a single data object instance can involve accessing many database fields and tables, executing multiple validation processes, and performing multiple calculations.

A particular operand of a business process or representation of an analog-world entity (e.g., business document, such as a contract or service agreement) may involve multiple logical data objects instances, each having multiple nodes and node components as defined in the schema for a logical data object. Each node can be associated with an instance of a database class that contains or specifies data for the logical data object node. Thus, for each logical data object instance needed for a collection of logical data object instances, each logical data object instance node is loaded, and the corresponding database class instance for the node is loaded.

This loading process is depicted in FIG. 4. After receiving a call through the interface 412, the logical data object manager 416 initiates the loading of a first logical data object node for a logical data object instance requested by the process 408 by loading the first logical data object node 424. As part of the loading, the first logical data object node loads a first logical object database class instance 428.

After the first logical data object node is loaded, the loading process is repeated. The logical data object manager 416 initiates the loading of a second logical data object node for a logical data object instance requested by the process 408 by loading the second logical data object node 432 for the instance, which in turn loads a second logical object database class instance 436. This loading cycle is repeated for all logical data object nodes associated with the logical data object instance requested by the process 408 through the final, or nth, instance, where the logical data object manager 416 initiates the loading of the nth logical data object node 440, which in turn loads the corresponding database class instance 444.

Complex processes 408 can include scores of logical data object instances for hundreds, thousands, or even millions (or more) of products (e.g., unique collections of data object instances) for one or more types of logical data objects. The loading process can thus be very time consuming and resource intensive. Accordingly, it can be beneficial to make any changes to the product, such as through its component logical data object instances, while the product is already loaded, rather than reloading the product at a later date.

Figure 5:
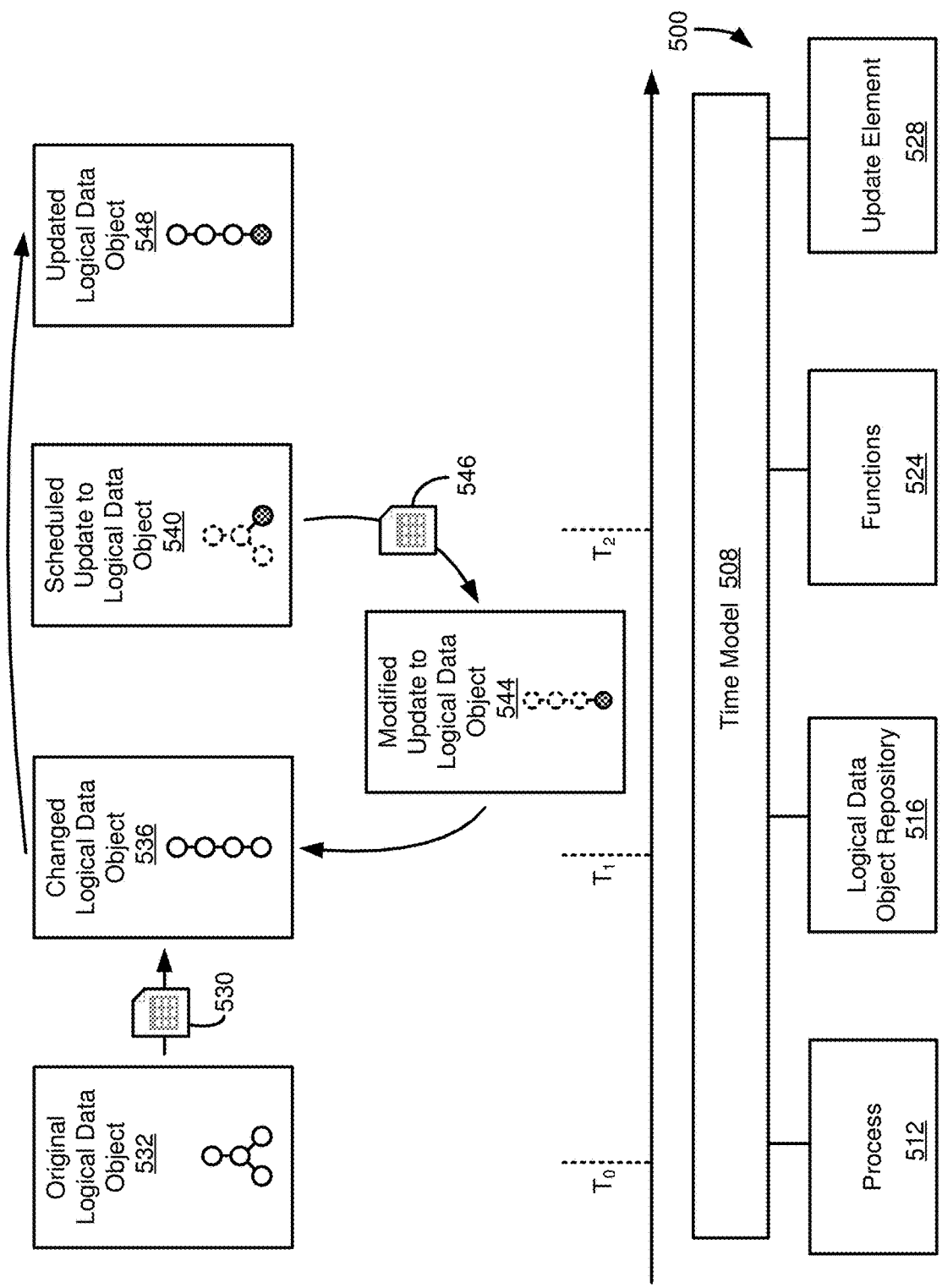
FIG. 5 is a diagram schematically depicting how a computing environment implementing innovations of the present disclosure can facilitate transforming logical data object instances and change requests from a first schema to a second schema.

Example 6—Example Conversion of Logical Data Object Instances and Change Requests Between Schemas FIG. 5 illustrates how disclosed innovations can facilitate changing the schema of a logical data object instance, including complex changes involving one or more of node additions, removals, and rearrangements. FIG. 5 also illustrates how disclosed innovations can facilitate applying change requests to logical data object instances, where the change requests are specified in a different schema that a current schema of a logical data object instance.

FIG. 5 is somewhat similar to the scenario depicted in FIG. 3, in that it provides a computing environment 500 that includes a time model 508 that interacts with a process 512, a logical data object repository 516, and functions 524. These components can operate at least generally as described for the corresponding components described in Example 4 and depicted in FIG. 3. However, the computing environment 500 also include one or more updates element 528, such as transformation functions or mapping components. The update element 528 can be used to map, such as by adding or removing data fields, or transform, such as adding, removing, or rearranging nodes in a hierarchy, a logical data object or a change request from a first schema to a second schema (or from the second schema to the first schema, in which case the element can be a rollback element).

At time $T_1$, an update element 530, such as a mapping, for example in a table, or a transformation function, is applied to a logical data object instance 532 in a first schema at time $T_0$. The application of the update element 530 to the first data object instance 532 produces a logical data object instance 536 having a second schema. As shown, the new schema includes a rearrangement of nodes. However, as described above, in various example, the new schema can include one or more of added nodes, removed nodes, rearranged nodes, added data fields, or removed data fields. According to a particular disclosed innovation, the second schema includes one or more added nodes, removed nodes, rearranged nodes, or combinations thereof.

In some cases, updating the first schema to the second schema can involve changing the schema of a logical data object instance, but maintaining the identity of the logical data object instance (e.g., the changes are actually made to the logical data object instance). In other cases, a new logical data object instance is created in the second schema, and data of the original logical data object instance in the first schema is transformed and copied to the new logical data object instance in the second schema. The transforming and copying can, in some implementations, be carried out stepwise, such as building the hierarchy one node at a time. In other implementations, an entire node hierarchy in the second schema can be constructed, and then the data from the first schema copied and transformed to the new logical data object instance in the second schema.

When a new logical data object instance is created, the new logical data object instance can be updated to have the identity of the old logical data object instance, or otherwise can be associated with the old logical data object instance. If a separate, new logical data object instance is created, in at least some aspects, the original logical data object instance can be deleted. In other aspects a new logical data object instance is created, and both the instances in both the old and new schemas are maintained, at least for a time. The new logical data object instance can be provided the identity of the old logical data object instance, or references to the old logical data object instance can be updated to references to the new logical data object instance.

A scheduled update 540 to the logical data object instance 532 is scheduled to take effect at time $T_2$. The time model 508 can determine when time $T_2$ has been reached. When time $T_2$ is reached, the update 540 can be changed from the first schema to the second schema to provide a modified update 544 using an update element 546. In particular aspects, the change from the first schema to the second schema can be accomplished an inverse of the update element 530. In other cases, a different update element can be used. For instance, it may be known that scheduled updates will only modify a limited number of elements in the first schema, and so a simpler update element 546 can be created and used. The modified update 544 can be applied to the logical data object 536 in the second schema to provide an updated instance 548 of the logical data object in the second schema.

Although FIG. 5 depicts the update 540 being modified when it is triggered, in other cases, the above-described modification process can be carried out prior to being triggered at $T_2$. For example, the modification process can be carried out during the same overall process that updates the schema of the logical data object instance 532 at $T_1$.

Although single update elements 530, 546 are shown, an update process for either a logical data object instance 532 or an update 540 can be carried out using multiple update elements 528. In a particular implementation, a mapping can be carried out to make relatively straightforward changes to a schema, such as adding or removing data fields at nodes having equivalent positions in the first and second schemas. After these changes are made, a transformation function can be applied to make changes to a node hierarchy of the schema. In other cases, the transformation function can be applied first, followed by a mapping. In yet further examples, rather than a single mapping or a single transformation function being used, multiple mappings or transformation functions can be used, which in some cases, can allow a more generic set of transformation functions to be applied to a variety of logical data object schemas, rather than having a monolithic transformation function or mapping that may be specific to a particular schema conversion between first and second schemas.

Figure 6:
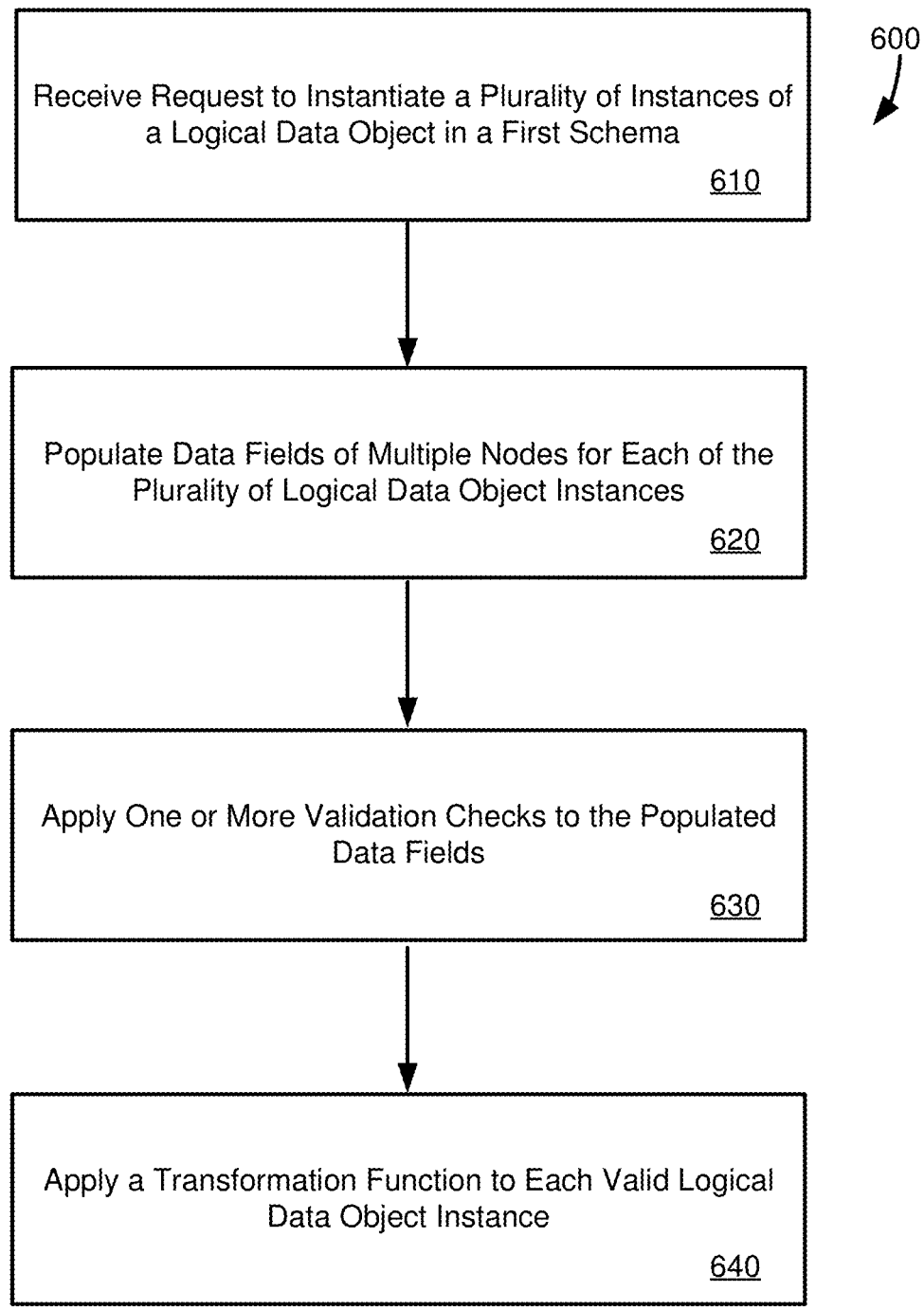
FIG. 6 is a flowchart of an example method of transforming a logical data object instance from a first schema to a second schema using a transformation function.

Example 7—Example Conversion of Logical Data Object Instance from First Schema to Second Schema FIG. 6 provides a flowchart of a method 600 describing operations in a disclosed innovation for transforming a logical data object instance from a first schema to a second schema. At 610, a request is received to instantiate a plurality of instances of a logical data object in a first schema. Data fields for multiple nodes for each of the plurality of logical data object instances are populated at 620. At 630, one or more validation checks are applied to at least a portion of the populated data fields.

A transformation function is applied to each valid logical data object instance at 640. The transformation function makes one or more changes to a hierarchical node structure of the first schema, including one or more node additions, removals, or rearrangements.

Example 8—Conversion of Change Request from First Schema to Second Schema

Figure 7:
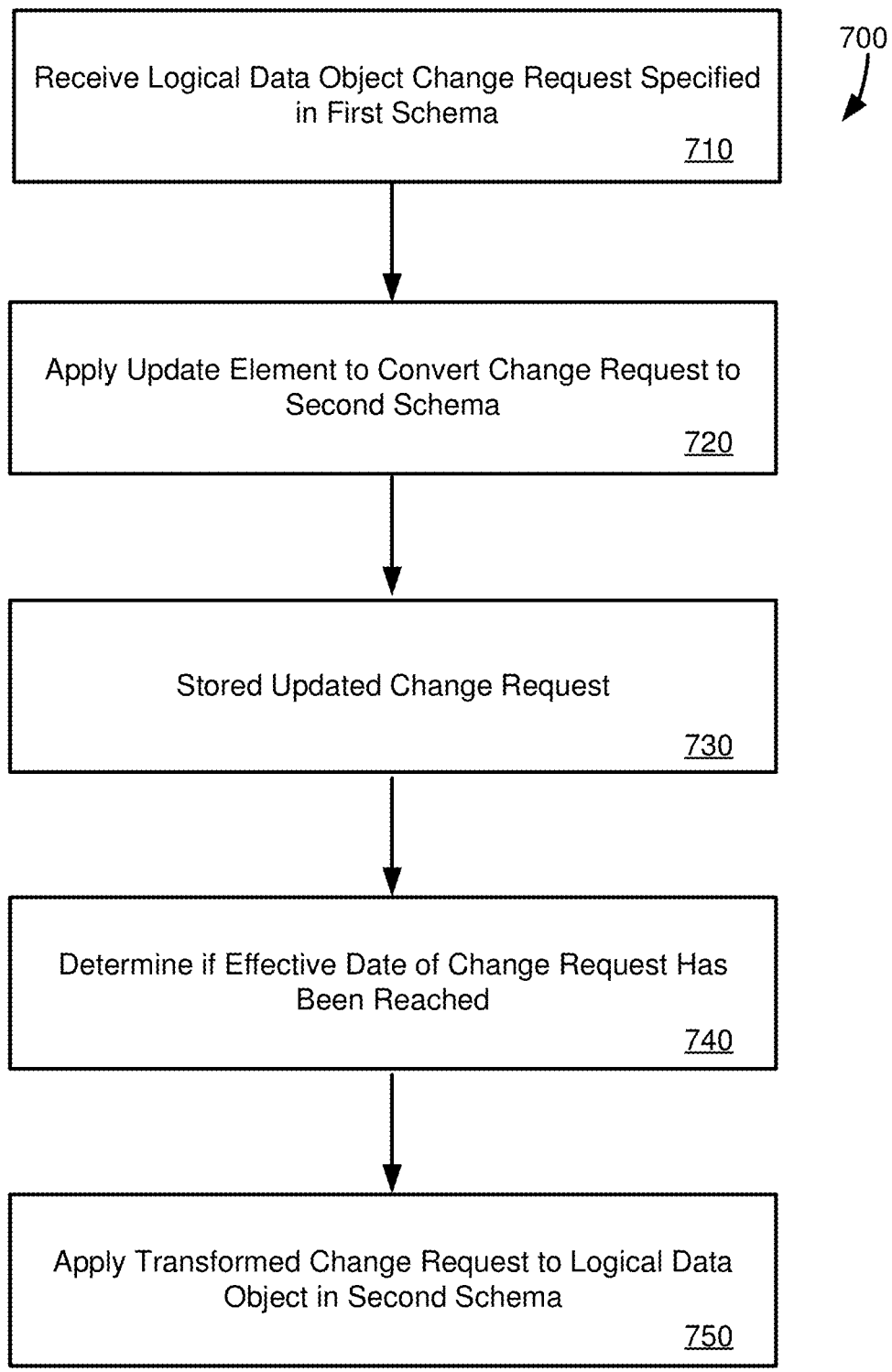
FIG. 7 is a flowchart of an example method of converting a change request from a first schema to a second schema using an update element.

FIG. 7 provides a flowchart of a method 700 describing operations according to a disclosed innovation for transforming a logical data object change request, or update, from a first schema to a second schema. At 710, a logical data object change request is received that is specified in a first schema. An update element is applied to the change request at 720 to convert the change request from the first schema to the second schema. In some cases, the update element is a mapping. In other cases, the update element is a transformation function that makes one or more changes to a node hierarchy.

The updated change request is stored at 730. At 740, it is determined if the effective date (e.g., a date or a combination of a date and time) has been reached. If the effective date has been reached, the updated change request is applied to a specified logical data object instance in the second schema at 750.

Example 9—Example Application of Backdated Change Requests

Figure 8:
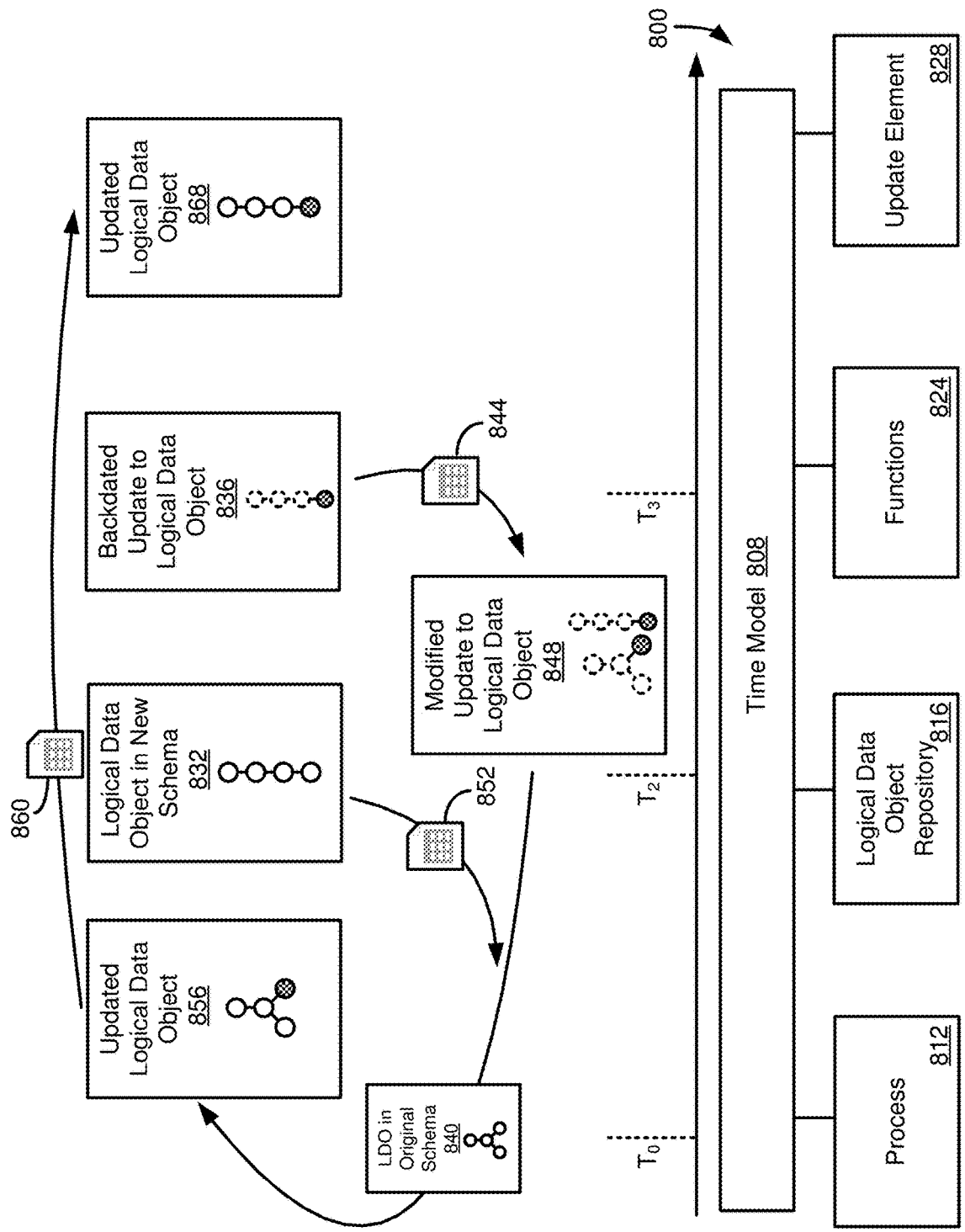
FIG. 8 is a diagram schematically depicting how a computing environment implementing innovations of the present disclosure can facilitate applying a backdated change request to a logical data object instance.

FIG. 8 illustrates how disclosed innovations can facilitate applying a backdated change request to a logical data object instance, where the logical data object instance has been changed from a first schema to a second schema, and the change request is to take into account, or be applied to or in, the first schema. For instance, certain changes may produce different results if they are applied to a logical data object instance in the first schema versus the same (or an equivalent) instance in second schema.

FIG. 8 is somewhat similar to the scenario depicted in FIG. 5, in that it provides a computing environment 800 that includes a time model 808 that interacts with a process 812, a logical data object repository 816, functions 824, and one or more update elements 828. These components can operate at least generally as described for the corresponding components described in Example 6 and depicted in FIG. 5.

FIG. 8 illustrates a logical data object instance 832 in an updated schema at a time $T_2$. A backdated change request, or update, 836 specified in the updated schema is received at time $T_3$, but is desired to be effective as the logical data object instance 832 existed at a time $T_0$, logical data object instance 840. An update element 844 (or multiple update elements), such as a mapping or a transformation function, is applied to the change request 836 to convert the change request from the second schema to a modified change request 848 in the first schema.

An update element 852 (or multiple update elements), which can be the same as the update element 844 in some examples, is applied to the logical data object instance 832 to produce a logical data object instance 840 in the first schema. Note that the logical data object instance 840 need not be the same (e.g., containing the same data values) as a logical data object instance from which the logical data object instance 832 was originally produced. That is, the logical data object instance 832 may have gone other changes after the schema change, and these changes can be incorporated in the logical data object instance 840.

The modified change request 848 is applied to the logical data object instance 840 to produce an updated logical data object instance 856, in the first schema. As a final step, the updated logical data object instance 856 can be converted back to the second schema using an update element 860 to provide an updated logical data object 868 in the second schema. The update element 860 can be an inverse of the update element 844.

In other scenarios, a change request can be applied to the logical data object instance 832 in another manner. For example, a change request can be specified in the first schema and converted to a second schema, such as using the update element 860 or another update element 828 (or multiple update elements). The modified change request can then be applied directly to the logical data object instance 832. Or, the change request can be specified in the first schema, the logical data object instance 832 can be converted to first schema as described above, and the change request in the first schema applied as depicted in FIG. 8.

Figure 9:
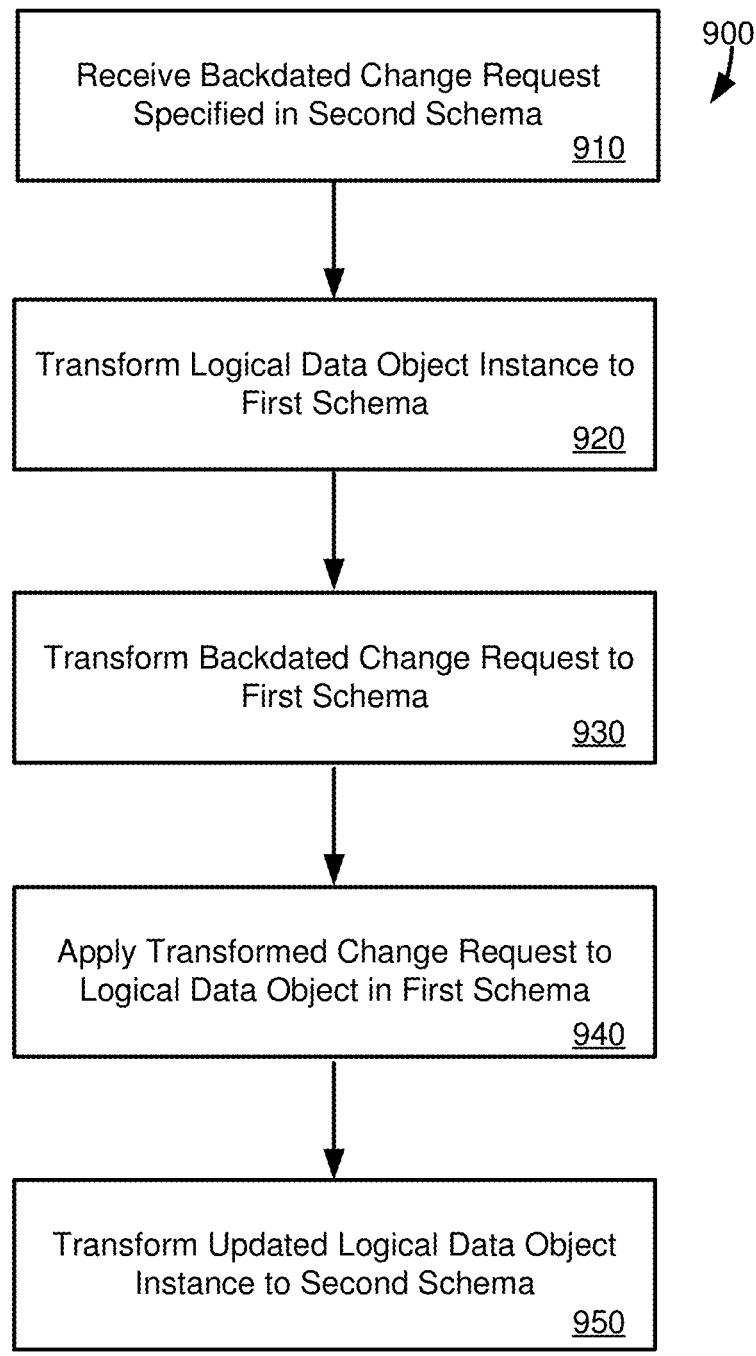
FIG. 9 is a flowchart of an example method of applying a backdated change request to a logical data object instance.
Figure 10:
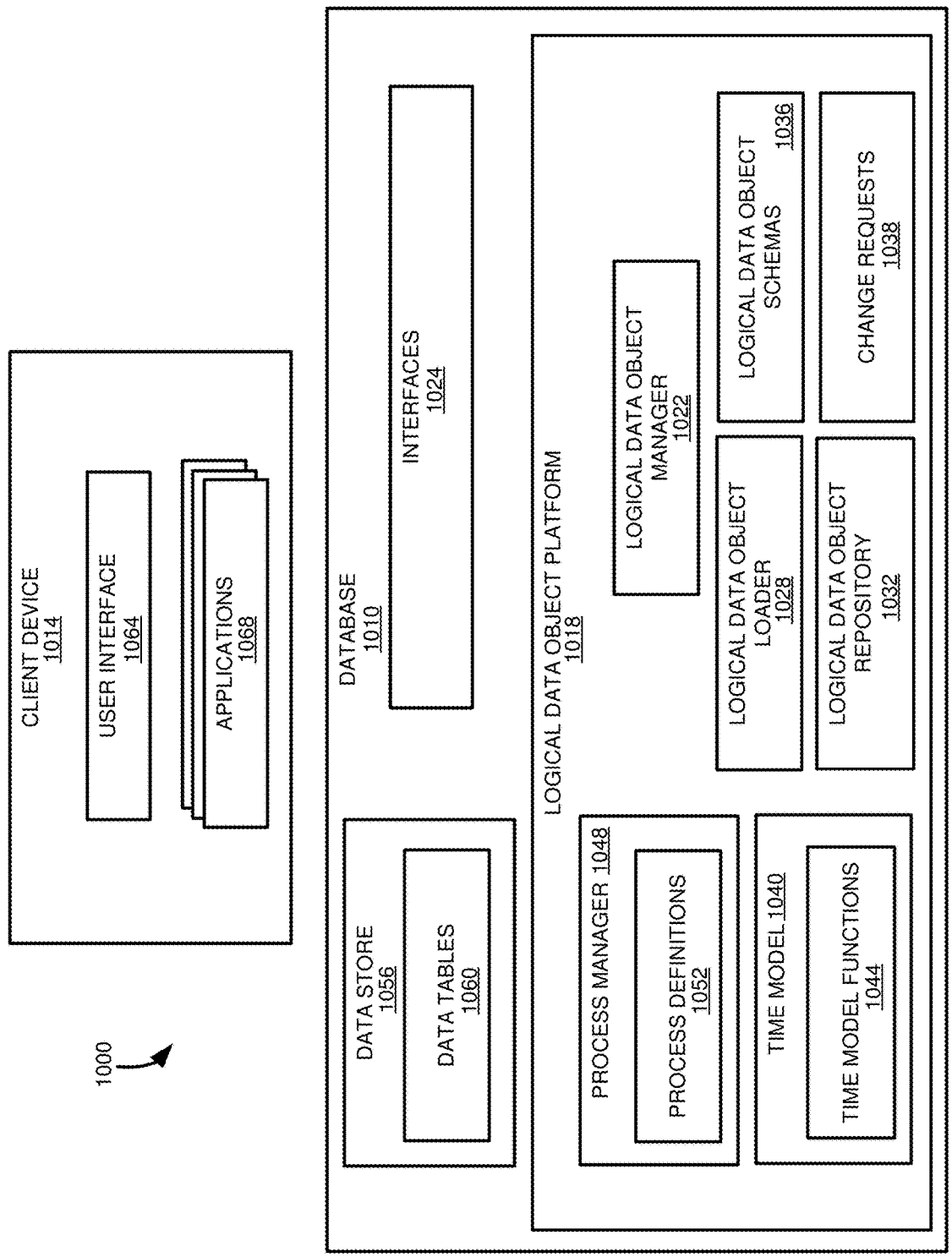
FIG. 10 is a block diagram of an example architecture in which one or more of the disclosed innovations can be implemented.

Example 10—Example Application of Backdate Change Request to Logical Data Object Instance in Second Schema FIG. 9 provides a flowchart of a method 900 describing operations according to a disclosed innovation applying a backdated change to a logical data object in a second schema. At 910, a backdated change request is received that is specified in a second schema, but is to be applied to a logical data object instance in a first schema. The logical data object instance in the second schema is converted to the first schema using one or more updates elements at 920. At 930, the backdated change request in the second schema is converted to a modified change request in the first schema using one or more update elements. The modified change request is applied to the logical data object instance in the first schema at 940. At 950, the modified logical data object instance in the first schema is converted to the second schema by applying one or more mapping elements Example 11—Example Architecture FIG. 10 depicts an architecture 1000 that can be used to implement the disclosed innovations. Generally, the architecture 1000 includes a database system 1010 and a client device 1014. The database system 1010 can be, for example, the HANA database system of SAP SE of Walldorf, Germany.

The database system 1010 includes a logical data object platform 1018. The logical data object platform 1018 can be used to create and manage logical data objects, including schemas for logical data objects, instances of logical objects, and processes involving logical data object instances. The logical data object platform 1018 includes a logical data object manager 1022. The logical data object manager 1022 can carry out operations involving the creation, reading, updating, and deletion of logical data object instances and logical data object schemas. The logical data object manager 1022 can include methods that can be called by other applications through one or more interfaces 1024.

Methods involved in loading logical data object instances can be specified in, and carried out by, a logical data object loader 1028. The logical data object loader 1028 can define how logical data object instances are stored and should be loaded, such as to optimize loading times. The logical data object instances can be stored in a logical data object repository 1032, and can be retrieved as specified by the logical data object loader 1028.

The logical data object platform 1018 can include logical data object schemas 1036 that can be used to create instances of logical data objects. The schemas can be structured as described in Example 2 and depicted in FIG. 1. The logical data object platform 1018 can also include change requests 1038. The change requests 1038 can be specified by a process, or can be ad-hoc change requests for a particular logical data object instance, including change requests entered by a user. The change requests 1038 can include change requests that are to be executed upon the occurrence of particular conditions, including being executed periodically or when a certain date (e.g., a date or a time and date) is reached.

The change requests 1038 can be executed by a time model 1040. The time model 1040 can determine when conditions for change request execution have been met and execute the appropriate change request(s) 1038 for the appropriate logical data object instances, including causing the instances to be loaded, if appropriate. The time model 1040 can include time model functions 1044. Time model functions 1044 can be processing related to a particular type of logical data object or a particular process using logical data object instances and can be triggered by the occurrence of particular conditions, such as a particular date. The time model functions 1044 can include checks to determine whether the specified processing can be carried out (e.g., whether all data is available or whether other conditions are met), as well as specific calculations or processing to be carried out when the time model function is executed. Such checks can also be incorporated in change requests 1038.

The logical data object platform 1018 can include a process manager 1048 that carries out processes involving logical data object instances according to one or more process definitions 1052. The process definitions 1052 can define various tasks or activities that can be carried out using logical data object instances, such as workflows or other representations of analog-world activities. The process manager 1048 can oversee the execution of the processes defined in the process definitions 1052.

Logical data object instances can be populated with data stored in a data store 1056. For example, the data can be stored in data tables 1060. The data tables 1060 can be for example, in a row store, a column store, or another type of store. In some cases, the data can be stored in a non-tabular format. The data of the data store 1056 can include data stored in-memory, in addition to data stored on a persistent storage medium.

A user can access the database system 1010 using the client device 1014. For example, through a user interface 1064, a user can interact with applications 1068 that allow a user to manipulate logical data objects and instances thereof. The applications 1068 can call methods provided by the interfaces 1024, including methods to create and edit processes, logical data object schemas, logical data object instances, and change requests.

The architecture 1000 can include more or fewer components than shown, and may be organized in other manners. For example, functionality of a particular component can be carried out by another component. In addition, in at least some cases, functionality can be carried out using multiple components. In particular cases, one or more of the components of the logical data object platform 1018 can be combined or split into additional components.

Figure 11:
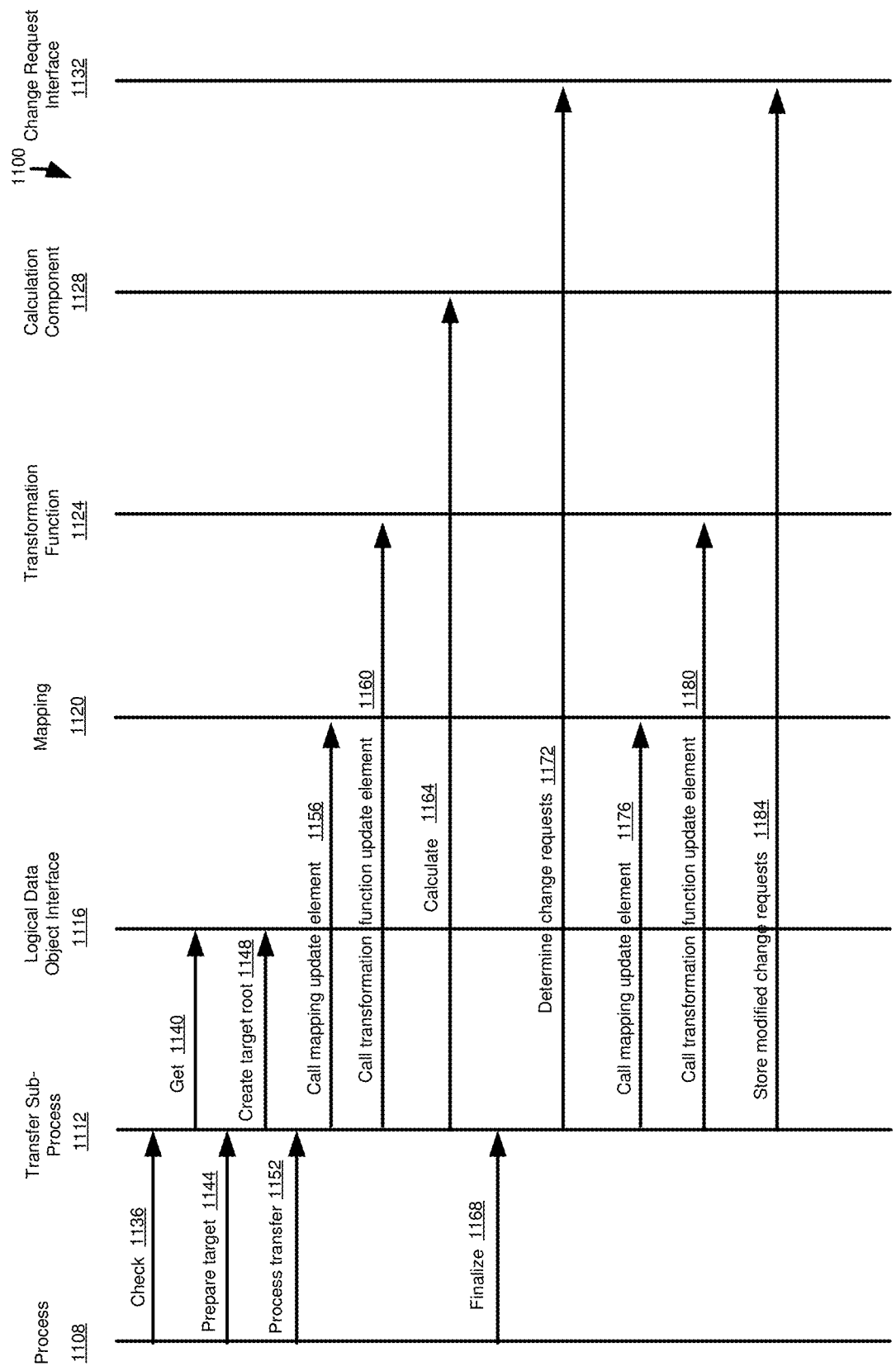
FIG. 11 is a diagram illustrating operations occurring during the conversion of a logical data object instance and a scheduled change request from a first schema to a second schema.

Example 12—Example Operations in Converting Logical Data Object Instance and Change Request from First Schema to Second Schema FIG. 11 illustrates an example scenario 1100 where a logical data object instance and a change request, each in a first schema, are transferred to a second schema. The operations in the scenario 1100 are carried out at or using a process 1108, a transfer sub-process 1112, a logical data object interface 1116, a mapping update element 1120, a transformation function update element 1124, a calculation component 1128, and a change request interface 1132. The scenario 1100 can be carried out using components of the architecture 1000 of FIG. 10. In particular, the logical data object interface 1116 and the change request interface 1132 can be provided by the interfaces 1124. The calculation component 1128 can be implemented by the process manager 1048 according to a process definition 1052. In other cases, the calculation component can be implemented by the time model 1040 according to a time model function 1044.

At 1136, for a particular logical data object instance, or a collection of related logical data object instances, the instance or collection is checked to determine whether the instance or collection (hereinafter a instance is discussed for convenience, but the discussion can apply to a collection of instances) can or should be updated from the first schema to the second schema. For example, it may be determined whether the instance is available, such as not being locked, and if an appropriate update element (or multiple update elements) are available to convert the first schema to the second schema.

If the logical data object instance successfully passes the checks at 1136, the logical data object instance is retrieved using the logical data object interface 1116 at 1140. At 1144, the process 1108 issues a prepare target request, which can create and initialize any data structures or data object instances to be used in converting the first schema to the second schema. For example, a logical data object instance in the second schema may be created, to which data from the logical data object in the first schema will be transferred. The transfer sub-process 1112 issues a request to create a root node of a logical data object instance in the second schema at 1148.

At 1152, the process 1108 requests the initiation of the update process, or transfer of information from the logical data object instance in the first schema to the logical data object instance in the second schema. The transfer sub-process 1112, at 1156, requests the execution of the mapping update element 1120. The mapping update element 1120 traverses the hierarchy of the logical data object instance in the first schema, and for nodes having a counterpart in the second schema, copies the information from the logical data object instance in the first schema to the logical data object instance in the second schema, along with making any changes to the node (e.g. adding or removing data fields or other node elements). Any node in a logical data object instance that does not have a counterpart in the other logical data object instance can be skipped by the mapping update element 1120.

The transfer sub-process 1112 requests the execution of the transformation function update element 1024 at 1160. The transformation function 1160 adds, removes, or rearranges nodes in a hierarchy of the first schema to produce the hierarchy of the second schema, and copies appropriate schema elements from the logical data object instance in the first schema to the logical data object instance in the second schema. In some cases, a new logical data object instance in the second schema is created prior to applying the transformation function 1160. In such cases, the transformation function can copy appropriate schema elements from the first logical data object instance in the first schema to the logical data object instance in the second schema. Although the scenario 1100 has been described as using both the mapping update element 1120 and the transformation function update element 1124 to change the logical data element instance from the first schema to the second schema, in other cases, the use of the mapping element 1120 can be omitted, and all changes can be made using the transformation function update element.

In some aspects, after the logical data object instance is converted to the second schema, it may be desirable to perform calculations or other processing on the logical data object instance. If any such processing is desired, the transfer sub-process 1112 can initiate the processing at 1164 by calling the calculation component 1128. The process 1108 finalizes the conversion process at 1168 by calling the transfer sub-process 1112, such as to publish or propagate information from the logical data object instance in the second schema to other logical data objects, applications, or data repositories.

In some embodiments, the scenario 1100 can end at 1168, such as if there are no scheduled change requests to be processed. If scheduled changed requests are scheduled for the logical data object instance, they too can be converted from the first schema to the second schema. The process for converting change requests to the second schema can be analogous to the process for updating the schema for the logical data object instance.

At 1172, change requests can be determined and read by the transfer sub-process 1112 calling the change interface 1132. In some cases, the change requests can be updated by using a mapping update element 1120, which can be called by the transfer sub-process 1112 at 1176. In other cases, the change requests can be updated by using the transformation function update element 1124, which can be called by the transfer sub-process 1112 at 1180. In a further implementation, and as shown, some changes can be made using the mapping update element 1120, and other changes, such as changes involving modifications to a node hierarchy, can be made by the transformation update element 1124. After the change requests have been updated, they can be stored by the transfer sub-process 1112 calling the change interface 1132 at 1184.

Example 13—Example Technical Solution

The technical solution can increase flexibility in the creation and management of logical data object instances, which can increase their utility. In addition, the ability to update logical object schemas can make their use more efficient, including improving the speed of processing logical data object instances and reducing memory usage.

The technical solution can also improve error handling during migration of logical data object instances to a new schema. In particular examples, the logical data object instance in the old schema is present at the same time as the logical data object instance in the new schema. If errors are encountered during the migration, the presence of both versions of the instance can allowed changes to be undone, corrections made, and updates reapplied during the migration process, such as without having to reload or recreate logical data object instances. Handling errors during the migration process can be more efficient than handling errors during other types of update processes, such as using API's, where an error may only be detected when an attempted update fails and a logical object instance reloaded, and a new target instance created, when the changes are to be reattempted.

The technical solution can also increase efficiency by allowing change requests to be updated to a new schema, in addition to the logical data object instances. Otherwise, the migration process may have to be staggered, with logical data object instances only being migrated to a new schema when pending, scheduled change requests have been executed. The innovations can also improve data accuracy by allowing backdated change requests to be applied in an original schema, rather than in an updated schema.

Example 14—Example Feature: Conversion of Logical Data Object Instances Between Schemas In any of the inventive examples herein, logical data object instances can be converted between schemas using an update element, such as a mapping or a transformation function. The conversion can allow greater flexibility in logical object schema definition and use of logical data objects. In addition, converting logical data object instances between schemas can allow change requests to be specified in a different format and the logical data object instances converted to the appropriate schema for the change request.

Example 15—Example Feature: Conversion of Change Requests for Logical Data Object Instances Between Schemas In any of the inventive examples herein, a change request for a logical data object instance to be converted between schemas. Such conversion can allow scheduled change requests to be converted to a different format useable with a logical data object instance also specified in the different format. Such conversion can facilitate backdating changes, as well as allowing logical data object instances to be converted to the different format before the date the change requests are scheduled to be effective.

Example 16—Example Computing Systems

Figure 12:
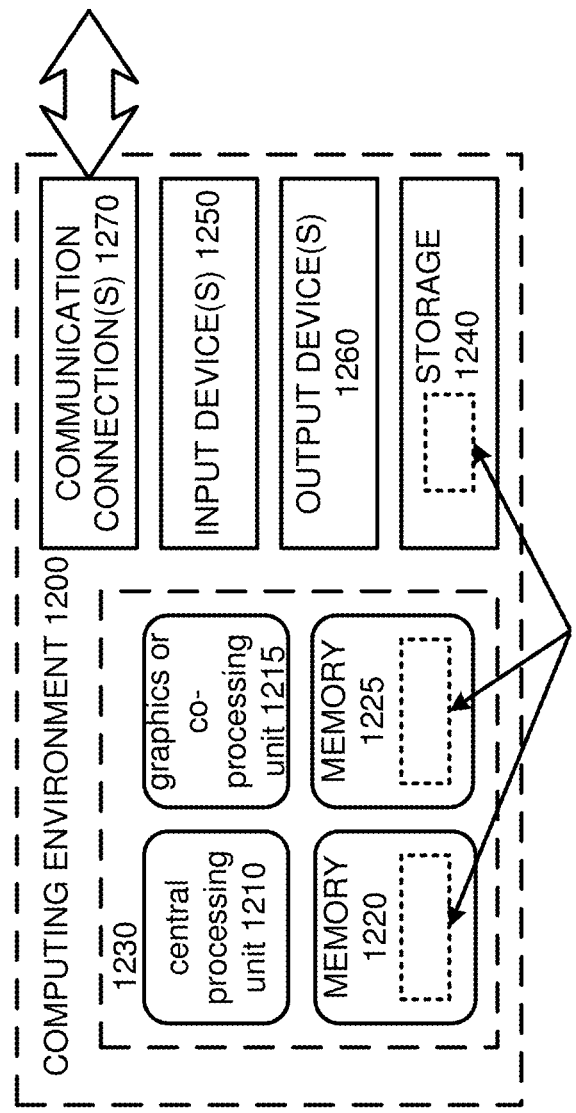
FIG. 12 is a diagram of an example computing system in which described embodiments can be implemented.

FIG. 12 illustrates a generalized example of a suitable computing system 1200 in which several of the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s), such instructions for logical data object schemas, change requests for to logical data object instances, and update elements.

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein. The storage 1240 does not include signals per se.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device (s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into one or more programs, such as one or more lines of code in one or more larger programs, or a general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 17—Example Cloud-Supported Environment

Figure 13:
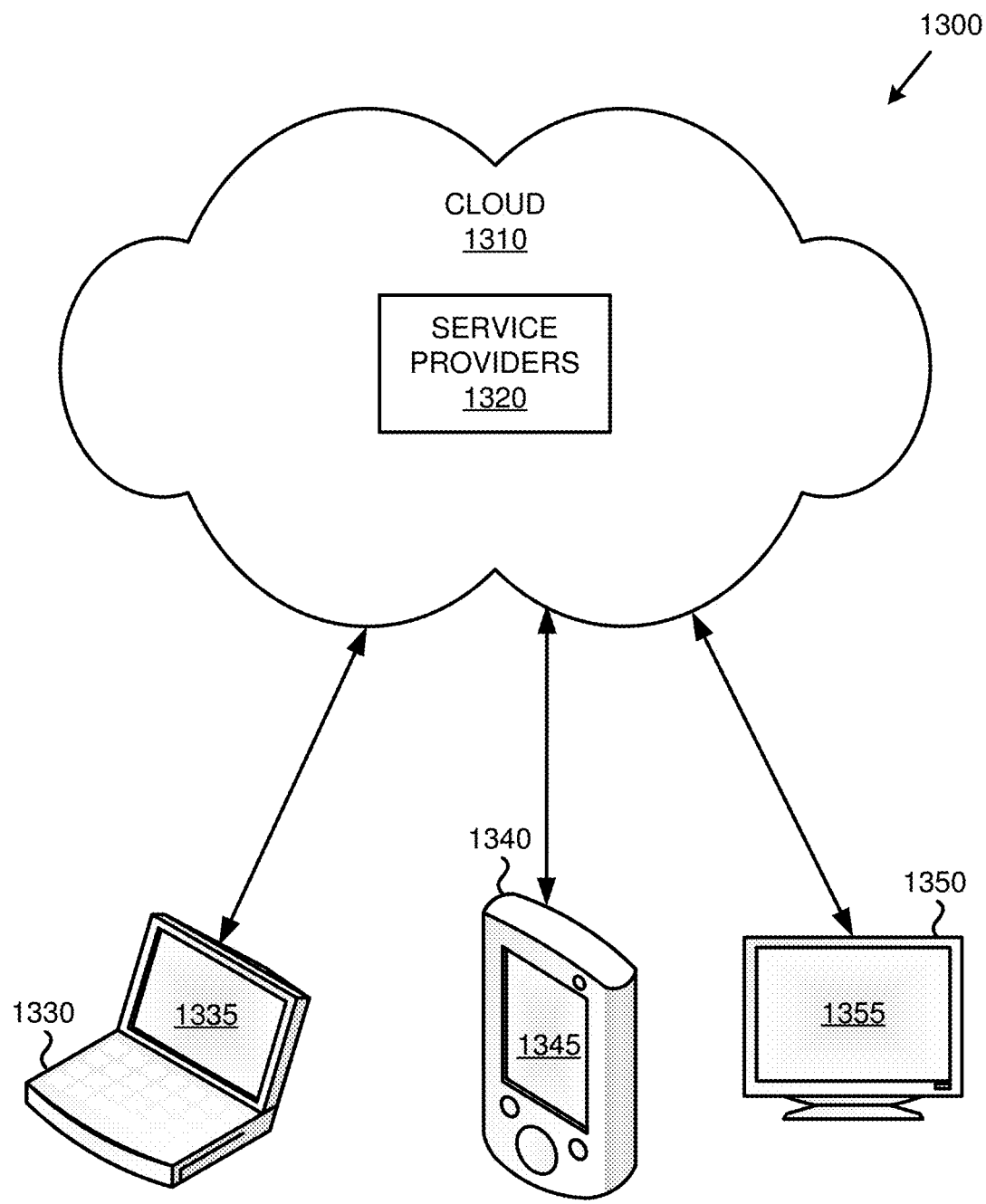
FIG. 13 is an example cloud-support environment that can be used in conjunction with the technologies described herein.

In example environment 1300 of FIG. 13, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. The connected device 1340 represents a device with a mobile device screen 1345 (e.g., a small size screen). For example, the connected device 1340 could be a mobile phone, smart phone, personal digital assistant, tablet computer, and the like. The connected device 1350 represents a device with a large screen 1355. For example, the connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Example 18—Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 19—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. One or more computer-readable media comprising computer-executable instructions that when executed cause a computing system to perform processing to convert a logical data object instance from a first schema to a second schema, the processing comprising:

receiving a request to instantiate a plurality of instances of a logical data object having a type, each of the plurality of logical data object instances being defined according to a first schema defined for the type, the first schema comprising a plurality of nodes arranged in a first hierarchical structure, the first hierarchical structure being internal to instances of the logical data object having the type, wherein nodes of the plurality of nodes represent one or more data fields of a given instance of the logical data object type or methods that operate on, or operate to produce, values for such data fields;

for each of multiple nodes of the plurality of nodes for each of the plurality of logical data object instances:
populating the data fields of the node with data from one or more data tables;
applying one or more validation checks to the populated data fields to provide validated data, wherein a logical data object instance that passes a validation check is a valid logical data object instance;

applying a first transformation function to each valid logical data object instance, the first transformation function converting the first hierarchical structure to a second hierarchical structure internal to instances of the logical data object having the type, wherein at least a portion of the plurality of nodes have a different arrangement in the second hierarchical structure than in the first hierarchical structure.

2. The one or more computer-readable media of claim 1, the processing further comprising:
  receiving a request to update an instance of the plurality of instances of the logical data object, the update being specified with respect to the first hierarchical structure;
  applying a second transformation function to the update request to provide a transformed update request, the second transformation function converting the update from being specified with respect to the first hierarchical structure to being specified with respect to the second hierarchical structure; and
  applying the update to the instance of the logical data object.

3. The one or more computer-readable media of claim 2, the processing further comprising:
  determining an effective date for the update; and
  determining whether the effective date has been reached;
  wherein applying the second transformation function and applying the update are carried out after it has been determined that the effective date has been reached.

4. The one or more computer-readable media of claim 2, the processing further comprising:
  storing the transformed update request;
  determining an effective date for the update; and
  determining whether the effective date has been reached;
  wherein applying the update is carried out after the effective date has been reached.

5. The one or more computer-readable media of claim 2, wherein the updated change request modifies a larger number of nodes than the change request.

6. The one or more computer-readable media of claim 2, wherein the updated change request modifies a smaller number of nodes that the change request.

7. The one or more computer-readable media of claim 1, wherein the second hierarchical structure has a different number of nodes than the first hierarchical structure.

8. The one or more computer-readable media of claim 1, the processing further comprising:
  prior to applying the first transformation function, applying one or more actions to the validated data of at least a portion of the nodes of at least a portion of the plurality of logical data object instances.

9. The one or more computer-readable media of claim 1, wherein a first data field is associated with a first node in the first hierarchical structure and the first transformation function associates the data field with a second node of the second hierarchical structure, wherein the first node is in a different position in the hierarchy in the second hierarchical structure than in the first hierarchical structure.

10. The one or more computer-readable media of claim 1, wherein the first node is not present in the second structure.

11. The one or more computer-readable media of claim 1, the processing further comprising:
  receiving user input defining the first transformation function.

12. The one or more computer-readable media of claim 1, the processing further comprising:
  calculating the first transformation function to convert between the first and second hierarchical structures.

13. The one or more computer-readable media of claim 1, the processing further comprising:
  receiving a request to update an instance of the plurality of instances of the logical data object, the update being specified in the second hierarchical structure;
  applying a second transformation function to the update request to provide a transformed update request, the transformation function converting the second hierarchical structure to the first hierarchical structure; and
  applying the transformed update request to the instance of the logical data object.

14. The one or more computer-readable media of claim 13, the processing further comprising:
  transforming the instance of the logical data object from the second hierarchical structure to the first structure, wherein applying the transformed update comprises applying the transformed update to the logical data object in the first hierarchical structure to provide an updated logical data object instance; and
  transforming the updated logical object instance to the second hierarchical structure.

15. The one or more computer-readable media of claim 1, the processing further comprising:
  prior to applying the first transformation function, if a node in the first hierarchical structure has an identical position in the hierarchy as a node in the second hierarchical structure, mapping at least a portion of node contents, including any data fields associated with the node, from the node of the first hierarchical structure to the corresponding node of the second hierarchical structure.

16. The one or more computer-readable media of claim 15, further comprising adding or removing a data field to or from the node of the second hierarchical structure compared with the corresponding node of the first hierarchical structure.

17. The one or more computer-readable media of claim 15, wherein the mapping is carried out prior to applying the first transformation function.

18. The one or more computer-readable media of claim 17, wherein the first transformation function is applied to nodes of the first hierarchical structure that do not have a corresponding node in the second hierarchical structure.

19. A system comprising:
  memory;
  one or more hardware processors coupled to the memory;
  one or more computer-readable media storing instructions that, when loaded into the memory, cause the one or more hardware processors to perform operations for:
    receiving a change request to a logical data object instance, the change request having an effective date and being specified with respect to a first logical data object schema defined for a logical data object type, the first logical data object schema comprising a plurality of nodes arranged in a first hierarchical structure, the first hierarchical structure being internal to instances of the logical data object having the type, wherein nodes of the plurality of nodes represent one or more data fields of a given instance of the logical data object type or methods that operate on, or operate to produce, values for such data fields;
    applying an update element to the change request to convert the change request to being specified with respect to a second schema defined for the logical data object type to provide a modified change request, wherein the second schema has a second hierarchical structure internal to instances of the logical data object having the type, wherein at least a portion of the plurality of nodes have a different arrangement in the second hierarchical structure than in the first hierarchical structure:
    storing the modified change request;
    determining the effective date has been reached; and applying the modified change request to a logical data object instance, of the plurality of logical data objects, specified by the modified change request, the logical data object instance having the second schema.

20. A method implemented at least in part by a computing system, the method comprising:
- receiving a plurality of logical data object instances of a logical data object type, the logical data object type being defined by a first schema defined for the type, the first schema specifying a first node hierarchy, the first node hierarchy being internal to instances of the logical data object having the type, wherein nodes of the plurality of nodes represent one or more data fields of a given instance of the logical data object type or methods that operate on, or operate to produce, values for such data fields;
- receiving a second schema for the logical data object type, the second schema specifying a second node hierarchy internal to instances of the logical data object type, the second node hierarchy including one or more of, compared with the first schema, an added node, a deleted node, and a rearranged node;
- receiving a transformation function for converting logical data object instances from the first schema to the second schema; and
- applying the transformation function to each of the plurality of logical data object instances to provide modified logical data object instances in the second schema, the applying comprising, compared with a logical data object instance in the first schema, one or more of adding a node, deleting node, or rearranging a node.

* * * * *